Feb. 23, 1937.  W. T. DALTON  2,071,502
WHEEL MOUNTING
Filed April 13, 1935
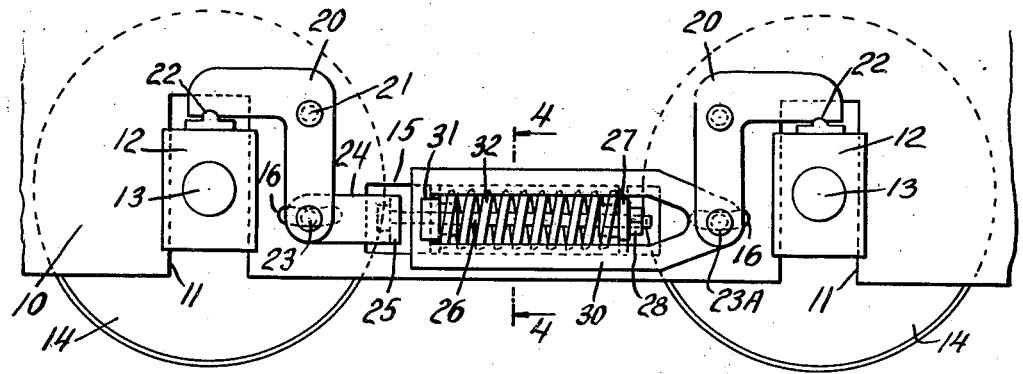
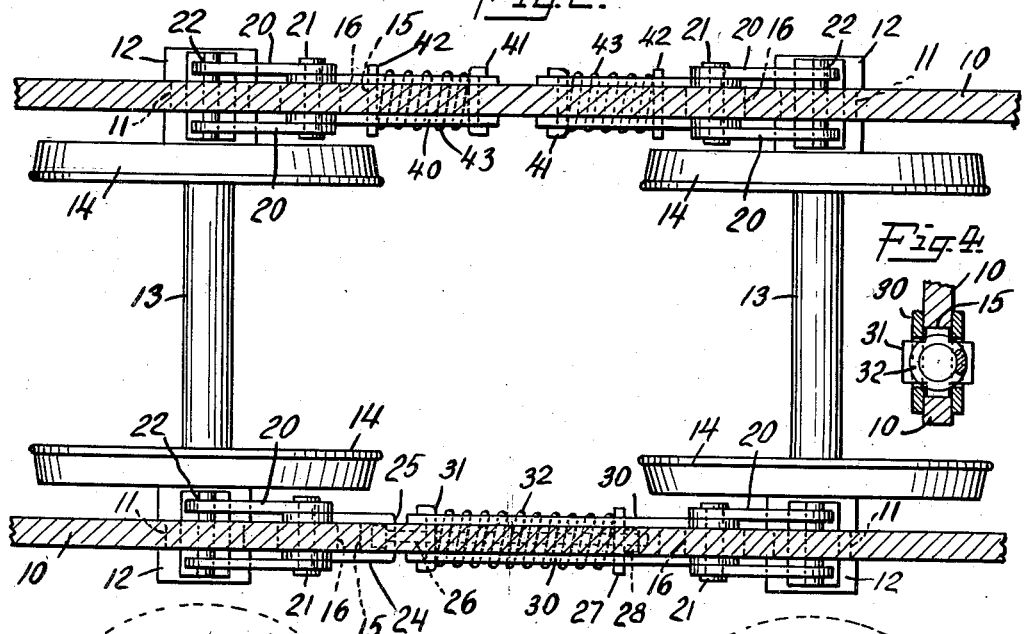
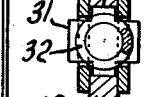
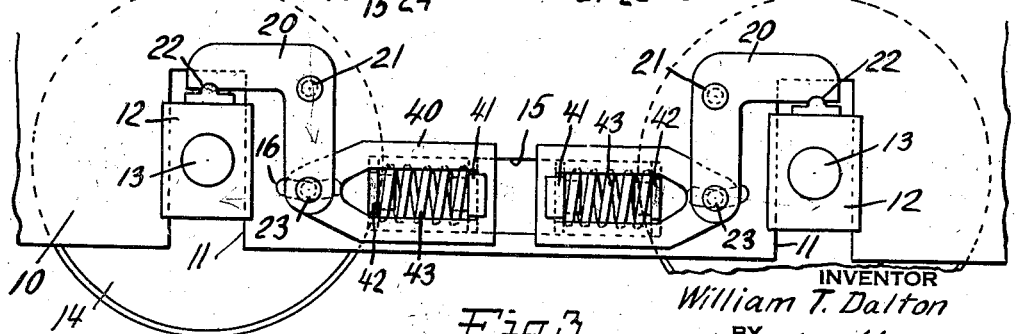
INVENTOR
William T. Dalton
BY
*Marshall & Hawley*
ATTORNEYS Patented Feb. 23, 1937

2,071,502

UNITED STATES PATENT OFFICE 2,071,502

WHEEL MOUNTING

William T. Dalton, Ansted, W. Va., assignor to The Gauley Mountain Coal Company, Ansted, W. Va., a corporation of West Virginia Application April 13, 1935, Serial No. 16,149

3 Claims. (Cl. 105—194)

This invention relates to improvements in wheel mountings, especially for mining locomotive or cars.

Its object is to provide a resilient equalizer for car wheels which is simple in construction, which does not increase the height above the rails of the car to which it is applied and which makes the locomotive run smoothly even over rough tracks and increases its traction by distributing the weight equally to all wheels.

Other objects of the invention will appear from the following specification in which I will describe the invention, the novel features of which will be pointed out in appended claims.

Referring to the drawing,

Fig. 1 is a side elevation of a portion of a car equipped with an embodiment of my invention;

Fig. 2 is a plan view of parts of a car with the equalizer of Fig. 1 shown at the lower part of the figure and another type of spring suspension for the wheels shown at the upper part of the figure. The side plates of the car are shown in section;

Fig. 3 is a side elevation showing the spring suspension of the upper part of Fig. 2; and Fig. 4 is a sectional end elevation of some of the parts of the novel equalizer, the section being taken on the line 4—4 of Fig. 1.

Like characters of reference designate corresponding parts on each of the figures.

10, 10 designates the side plates of the car. These are cut away at 11, 11 to provide vertical guides for the journal boxes 12, 12 which carry the journals 13, 13 of the wheels 14, 14. The journal boxes are grooved to fit the guides thus formed in the side plates. The side plates are also cut out at 15 to provide clearances for the parts of the equalizer and springs which I will now describe.

One arm each of bell crank levers 20, which are pivoted in the side plates 10 at 21, bears on the top of the journal boxes, as at 22. The other arms of the bell crank levers of each pair are connected by transverse pins 23, 23A which pass through arcuate slots 16 in the side plates.

On the equalizer side, shown in Fig. 1 and the lower part of Fig. 2, the pin 23 is connected to shackles 24 which are formed in one piece, connected by a transverse plate 25. 26 is a bolt which passes through this plate. A spring seat 27 is on the other end of this bolt, held in place by an adjustable nut 28.

The other pin 23A is connected to a pair of yokes 30, the other ends of which are connected by a transverse plate 31 which forms another spring seat. 32 is a compression spring interposed between the spring seats 27 and 31.

It will be seen from this description that the weight of the car tends to raise the ends of the arms of the bell crank levers which bear on the journal boxes and to spread their other ends apart. This tendency is opposed by the spring 32, the compressive force of which may be regulated by adjusting the position of the nut 28. It will also be seen that the journal box 12 at one end of the car may rise with a corresponding depression of the journal box at the other end of the car without disturbing the equal distribution of the weight of the car borne by these two journal boxes and their corresponding wheels and without materially affecting the level of the car. Correspondingly, the level of the car caused by irregularities of the rail or obstructions on the other side of the car may vary considerably without disturbing the equalization of the weight of the car on the side provided with the arrangement which has just been described. Furthermore, the weight of the car on the side which is equipped with this equalizer is at all times spring-cushioned. The other side of the car may be equipped with a similar equalizer, but this is not necessary. I have shown it equipped with a novel spring suspension arrangement which I will now describe.

The pins 23 which pass through the lower ends of each of the bell crank levers 20 are connected with yokes 40, the other ends of which are connected by cross plates 41 which form spring seats. Other spring seats 42 are seated in the ends of the slot 15. Springs 43 are interposed between the spring seats 41 and 42.

This provides an adequate resilient support for the car. If one of the wheels on this side is unduly raised, as by rolling over an obstruction, for example, the resultant tilting of the car will be compensated for by the equalizer on the other side. Therefore, there is a true cooperative relation between the unlike wheel mountings on opposite sides of the car.

The parts of both of the arrangements shown and described are low and therefore do not increase the car height. A car may be equipped with either or both of these arrangements and they are so arranged and designed that they are interchangeable.

Structural modifications may be made within the spirit and scope of this invention and I intend no limitations other than those imposed by the appended claims.

What I claim is:

1. A car body comprising side plates, each having two spaced portions cut away to form vertical guides, journal boxes movable in said guides, bell crank levers pivotally supported on the car body, one arm of each bell crank lever engaging one of the journal boxes, a spring interposed between the other arms of said levers on one side of the car body, and a spring interposed between the car body and each of the other arms of said levers on the opposite side.

2. A car body comprising side plates, each having two spaced portions cut away to form vertical guides, journal boxes movable in said guides, bell crank levers pivotally supported on the car body, one arm of each bell crank lever engaging one of the journal boxes, the other arm of each bell crank lever extending downwardly from its pivotal support, a spring interposed between the downwardly extending arms of said levers on one side of the car body, and a spring interposed between the car body and the downwardly extending arm of each of said levers on the other side.

3. A car body comprising side plates, each having two spaced portions cut away to form vertical guides, journal boxes movable in said guides, bell crank levers pivotally supported on the car body, one arm of each bell crank lever engaging one of the journal boxes, the other arm of each bell crank lever extending downwardly from its pivotal support, a pair of relatively slidable members arranged to be maintained in longitudinal alinement interconnecting the downwardly extending arms of said levers on one side of the car body, a spring bearing on said members, and a spring interposed between the car body and the downwardly extending arm of each of said levers on the other side.

WILLIAM T. DALTON.